United States Patent [19]

Hayano

[11] Patent Number: 5,511,149
[45] Date of Patent: Apr. 23, 1996

[54] PRINTER EMULATOR CAPABLE OF EMULATING A PLURALITY OF PRINTERS WHICH OPERATE IN DIFFERENT MODES

[75] Inventor: Fumihito Hayano, Ogaki, Japan

[73] Assignee: Brother Kogyo Kabushiki Kaisha, Aichi, Japan

[21] Appl. No.: 181,453

[22] Filed: Jan. 14, 1994

Related U.S. Application Data

[63] Continuation of Ser. No. 908,992, Jul. 6, 1992, abandoned.

[30] Foreign Application Priority Data

Jul. 10, 1991 [JP] Japan .................................. 3-195748

[51] Int. Cl.$^6$ .................................................. G06K 15/00
[52] U.S. Cl. .................................. 395/112; 395/114
[58] Field of Search .................................. 395/112, 114, 395/500; 400/61–62, 76–77; 358/402, 404, 444, 445

[56] References Cited

U.S. PATENT DOCUMENTS

| | | | |
|---|---|---|---|
| 4,968,159 | 11/1990 | Sasaki et al. | 400/76 |
| 4,992,957 | 2/1991 | Aoyama et al. | 395/112 |
| 5,010,514 | 4/1991 | Kippenhan et al. | 395/114 |
| 5,165,014 | 11/1992 | Vassar | 395/112 |
| 5,222,200 | 6/1993 | Calister et al. | 395/118 |
| 5,293,466 | 3/1994 | Bringmann | 395/112 |

FOREIGN PATENT DOCUMENTS

| | | |
|---|---|---|
| 94493 | 11/1983 | European Pat. Off. . |
| 395562 | 10/1990 | European Pat. Off. . |
| 63-216756 | 9/1988 | Japan . |
| WO90/12359 | 10/1990 | WIPO . |

Primary Examiner—Arthur G. Evans
Attorney, Agent, or Firm—Oliff & Berridge

[57] ABSTRACT

A printer emulator having a function of emulating different types of printers which operate respective operation modes. The emulator is operable according to print data in a selected one of the operation modes of the printers, and includes a print data memory for storing the print data consisting of at least one job unit each representative of a printing job. The print data include at least one mode-determinative code which determines an effective operation mode for each job unit of the print data. The emulator further includes a unit detecting device for detecting each job unit of the print data, a mode determining device for determining the effective operation mode for each job unit of the print data, on the basis of the mode-determinative code or codes, and a printing device for performing the printing job according to each job unit of the print data in the effective operation mode determined by the mode determining device.

12 Claims, 5 Drawing Sheets

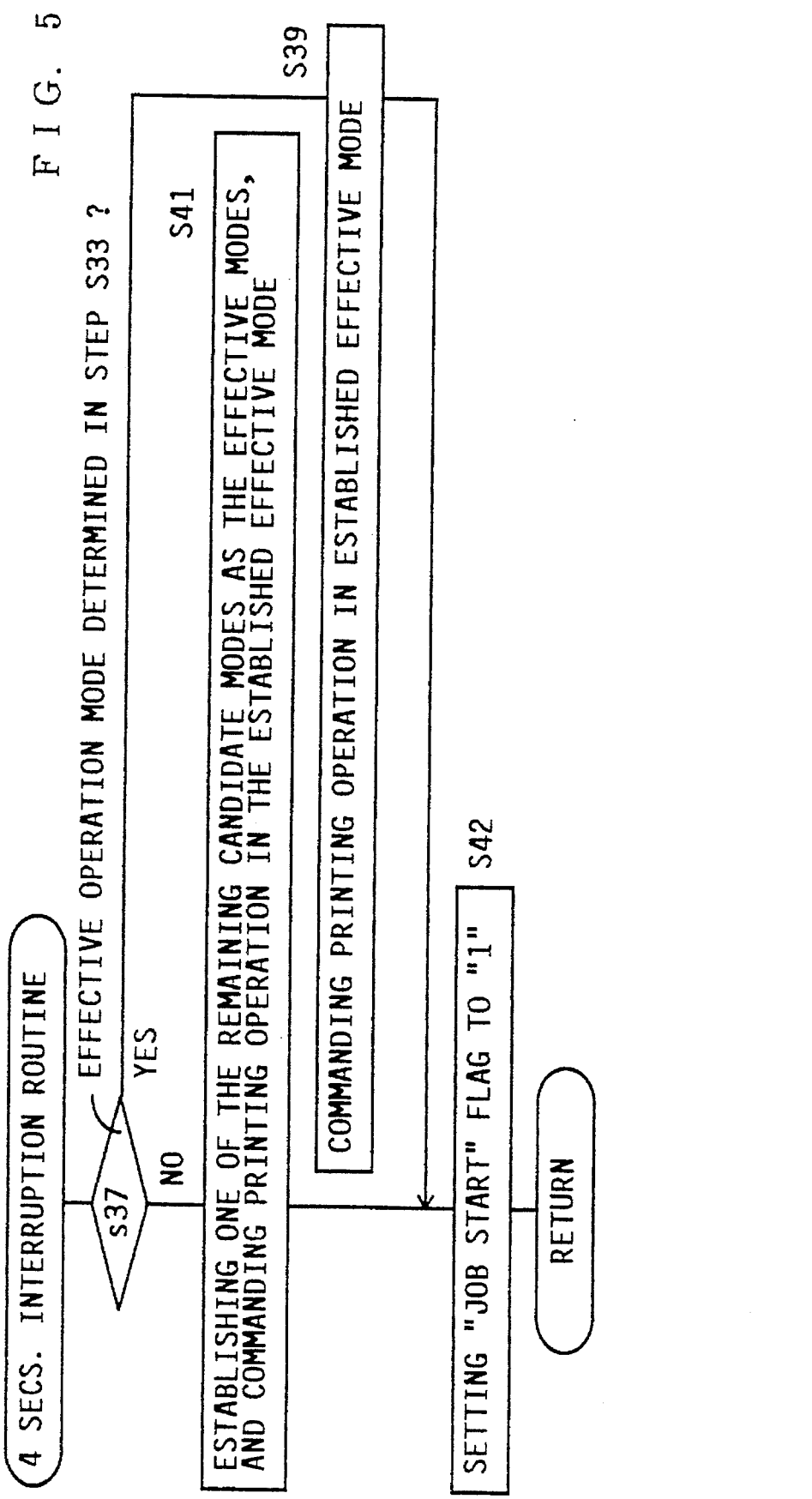

PRINTER EMULATOR CAPABLE OF EMULATING A PLURALITY OF PRINTERS WHICH OPERATE IN DIFFERENT MODES

This is a continuation of application Ser. No. 07/908,992 filed Jul. 6, 1992, now abandoned.

BACKGROUND OF THE INVENTION

1. Field of the Invention

The present invention relates in general to an emulator for emulating a plurality of printers having respective different operation modes, and more particularly to such a printer emulator capable of detecting each of job units of a received batch of print data, and determining the operation mode for each job unit representative of a printing job, according to control codes included in the received print data, so that the printing job is effected in the determined mode.

2. Discussion of the Invention

Various types of printer are known, which operate according to a received batch of print data representative of texts to be printed. The print data include text data representative of alphabetic letters, numerals, symbols and other characters, and various control codes such as a code representative of the size of the characters, a code for commanding carriage return and line feeding movements, and a code for commanding pagination of the text. For improved printing quality and versatility, some printers are operable in two or more different modes, which are established by appropriate control codes.

For instance, a printer has a plurality of operation modes which correspond to respective combinations of printing speed (high-speed printing or low-speed printing), printing attitude (horizontal printing or vertical printing), and image resolution value (high-resolution or low-resolution, which is determined by the number of dots per inch in the case of a dot-matrix printer). The operation modes are selected by two or more control codes so-called "function-expanding control codes" (which follow an ESC code). Of course, the operation modes available on one type of printer may be different from those on another type of printer.

Therefore, suitable control codes should be included in the print data, so that printing jobs represented by respective job units of the print data are performed in the suitable operation modes. On the other hand, the print data used for a given type of printer should be written in a format that meets the operation modes available on that printer. Otherwise, the printing jobs represented by the print data cannot be performed in the intended operation modes.

In the light of the above inconvenience, a printer emulator is proposed as disclosed in laid-open Publication No. 63-216765 of unexamined Japanese Patent Application. The printer emulator disclosed therein is capable of emulating two or more types of printers, namely, capable of effecting printing jobs according to print data written in formats for other printers, by automatically detecting the operation mode of the received print data, on the basis of the control codes included in the print data. Thus, the batches of print data prepared for the other printers can be used on the printer emulator.

In the case where such a printer emulator is connected through an interface to a network which includes a plurality of computers or terminals, the printer emulator receives batches of print data from those external computers or terminals, which are written in different formats for different operation modes. In other words, a batch of print data received by the printer emulator may consist of two or more job units which represent individual printing jobs that should be performed in different modes desired by the operators of the external computers. In this case, however, there is a risk that the printer emulator performs all printing jobs in the same mode determined for the first commanded printing job, although the individual printing jobs commanded by the different external computers should be performed in respective different modes.

SUMMARY OF THE INVENTION

The present invention was developed in the light of the drawback experienced in the prior art as described above. It is therefore an object of the present invention to provide an improved printer emulator capable of emulating a plurality of types of printers having different operation modes, such that individual printing jobs commanded by respective job units of a received batch of print data which are written in different formats are performed in the respective operation modes suitable for the job units, even if the printer emulator is used in a network including such two or more types of printers.

The above object may be achieved according to the principle of the present invention, which provides a printer emulator having a function of emulating two or more types of printers which operate in respective operation modes, the printer emulator being operable according to print data in a selected one of the operation modes of the plurality of printers, the printer emulator comprising: (a) print data memory means for storing the print data consisting of at least one job unit each of which represents a printing job, the print data comprising control codes which include at least one mode-determinative code which determines an effective operation mode in which each job unit of the print data is executed; (b) unit detecting means for detecting each job unit of the print data; (c) mode determining means, operable on the basis of the mode-determinative code or codes, for determining the effective operation mode for each job unit of the print data; and (d) printing means, responsive to the mode determining means, for performing the printing job according to each job unit of the print data in the effective operation mode determined by the mode determining means.

In the present printer emulator, a batch of print data received from external devices such as computers or terminals is stored in the print data memory means. Each job unit of the print data is detected by the unit detecting means, and the effective operation mode for each job unit is determined by the mode determining means, based on the mode-determinative code or codes included in the print data. The printing job according to each job unit of the print data is performed by the printing means, in the effective operation mode determined by the mode determining means. Therefore, any printing job represented by print data received from any external devices can be performed in the suitable operation mode that meets the format in which the job unit is written. Thus, the present printer emulator can be used in a network which includes two or more printers having different operation modes.

The detection of each job unit of the received print data can be effected based on a suitable control code or codes included in the print data, namely, a unit-determinative code which may be a job end code representative of the end of each job unit of the print data. The job end code may be a paper eject command for ejecting a paper sheet such as a form sheet, or a printer reset command for resetting the control device 32. Further, the unit-determinative code may be any other code such as: a job start code representative of the beginning of each job unit of the print data; a combination of a plurality of control codes the number of which is larger than a predetermined value; and a combination of a plurality of control codes which appear in the print data in a predetermined order. It is noted that two or more unit-determinative codes may be used. For example, the job end code and the job start code are used for detecting each job unit of the received print data.

The determination of the effective operation mode for each job unit can be effected based on a suitable control code or codes, which may be a mode code indicative of the operation modes of the printers, a combination of two or more control codes the number of which is larger than a predetermined value, or which appear in in the print data in a predetermined order. Of course, two or more mode-determinative codes may be used for determining the effective mode for each job unit. Where a control code consists of two or more character codes, a part of these character codes may be used as the mode-determinative code. For instance, the first two character codes of the three-character control code may be used as the mode-determinative code. Further, parts of different groups of character codes as two control codes may be used as the mode-terminative codes.

BRIEF DESCRIPTION OF THE DRAWINGS

The above and optional objects, features and advantages of this invention will be better understood by reading the following detailed description of a presently preferred embodiment of the invention, when considered in connection with the accompanying drawings, in which:

FIG. 5 is a flow chart illustrating a 4-secs. interruption routine executed during interruption of the main routine of FIG. 2.

DETAILED DESCRIPTION OF THE PREFERRED EMBODIMENT

Figure 1:
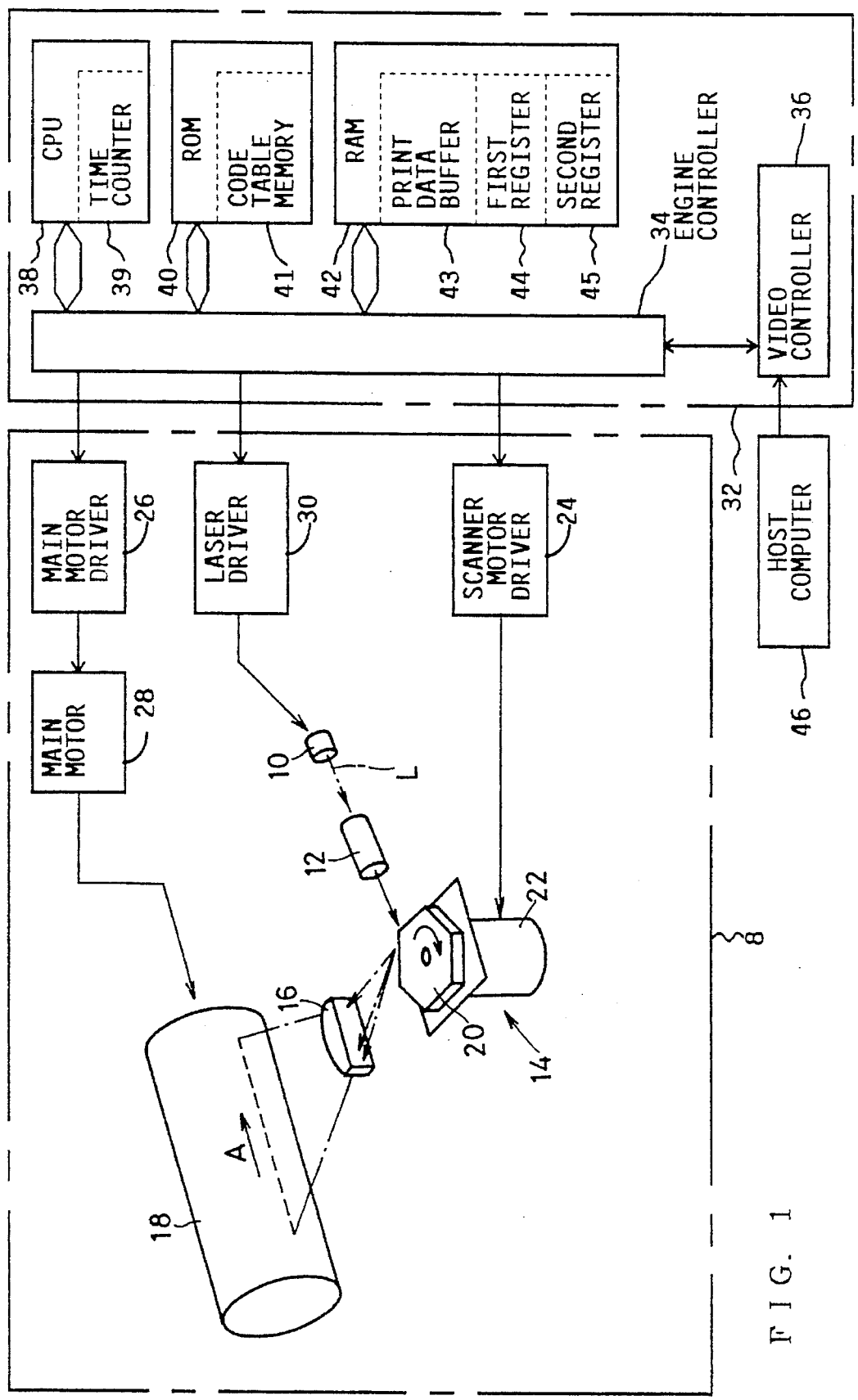
FIG. 1 is a schematic block diagram showing one embodiment of a printer emulator of the present invention, in the form of a laser printer having an optical printing device, and a control device for controlling the printing device.

Referring first to the schematic block diagram of FIG. 1, the printer emulator in the form of a laser printer has an optical printing device and a control device which are shown generally at 8 and 32, respectively. The optical printing device 8 includes a semiconductor laser 10 which generates a laser beam L, which is incident upon a polygon mirror 20 of a scanning device 14, through a collimator lens 12 which converts the laser beam L into parallel rays of light. As the polygon mirror 20 is rotated, the incident laser beam L is periodically deflected over a predetermined angular range, as well known in the art. The laser beam L deflected by the polygon mirror 20 sweeps or scans a photoconductive drum 18 through a fθ lens 16, in a direction indicated at A, which is parallel to the axis of rotation of the drum 18 and perpendicular to the axis of rotation of the polygon mirror 20.

As the photoconductive drum 18 is repeatedly imagewise scanned by the laser beam L while the drum 18 is rotated about its axis parallel to the scanning direction A, a latent image is formed on the photoconductive surface of the drum 18. As well known in the art, the latent image is developed by a suitable developing device into a visible image, which is transferred to a paper sheet or web or any other desired recording medium by a suitable image transfer device.

The scanning device 14 has a scanner motor 22 for rotating the polygon mirror 20, which has six light reflecting faces. The scanner motor 22 is driven by a scanner motor driver 24, so that the polygon mirror 20 is rotated at a selected constant speed, about the axis perpendicular to the plane in which the laser beam L is deflected by the light reflecting faces. The rotating speed of the polygon mirror 20 is selected as desired, from three predetermined speed values which correspond to respective three image resolution values 240 DPI (dots/inch), 300 DPI and 400 DPI.

The photoconductive drum 18 is rotated by a main motor 28, which is driven by a main motor driver 26 so that the drum 18 is rotated at a constant speed which corresponds to the selected speed of rotation of the polygon mirror 20, namely, the selected image resolution value. The main motor 28 also functions to operate paper feed and ejector rolls, the image developing device indicated above, an image fixing device, and other devices as needed.

The semiconductor laser 10 is turned on and off by a laser driver 30, depending upon the presence or absence of image dots at respective picture element positions along each scanning line, which extends parallel to the scanning direction A. The scanner motor driver 24, laser driver 30 and main motor driver 26 are controlled according to command signals from the control device 32.

The control device 32 includes an engine controller 34, a video controller 36, a central processing unit (CPU) 38, a read-only memory (ROM) 40, and a random-access memory (RAM) 42. The CPU 38 operates to perform various data processing operations according to control programs stored in the ROM 40, while utilizing a temporary data storage function of the RAM 42.

The video controller 36 is connected to a host computer 46, which is adapted to receive various batches of print data from different external computers or terminals. These batches of print data may represent printing jobs which are to be performed in the same mode, or in different modes in which respective various types of printers operate. Further, a batch of print data received from a given computer may represent such different printing jobs. Therefore, the print data received by the host computer 46 consists of at least one job unit each of which represents a printing job to be performed by a given type of printer in a certain operation mode. Namely, individual job units of print data received by the host computer 46 are written in the same format, or in different formats used for respective types of printers. A batch of print data usually includes image data representative of images to be printed, and control codes such as mode-determinative codes (e.g., code representative of image resolution value) and unit-determinative codes (e.g., JOB END code representative of the end of each job unit), which will be described.

The image data for each printing job received by the video controller 36 is converted into corresponding dot data representative of dots to be formed by the optical printing device 8, depending upon the desired image resolution value (240 DPI, 300 DPI or 400 DPI) which is specified by a suitable control code included in the print data. This control code may be used as the mode-determinative code. The engine controller 34 receives a batch of dot data from the video controller 36, and supplies modulation signals to the laser driver 30 according to the dot data, so that the semiconductor laser 10 is turned on and off depending upon the presence and absence of dots represented by the dot data.

The engine controller 34 also supplies drive signals to control the main motor driver 26 and scanner motor driver 24, for rotating the drum 18 at the suitable speed and for rotating the polygon mirror 20 for scanning the surface of the drum 18 at a predetermined interval.

Figure 2:
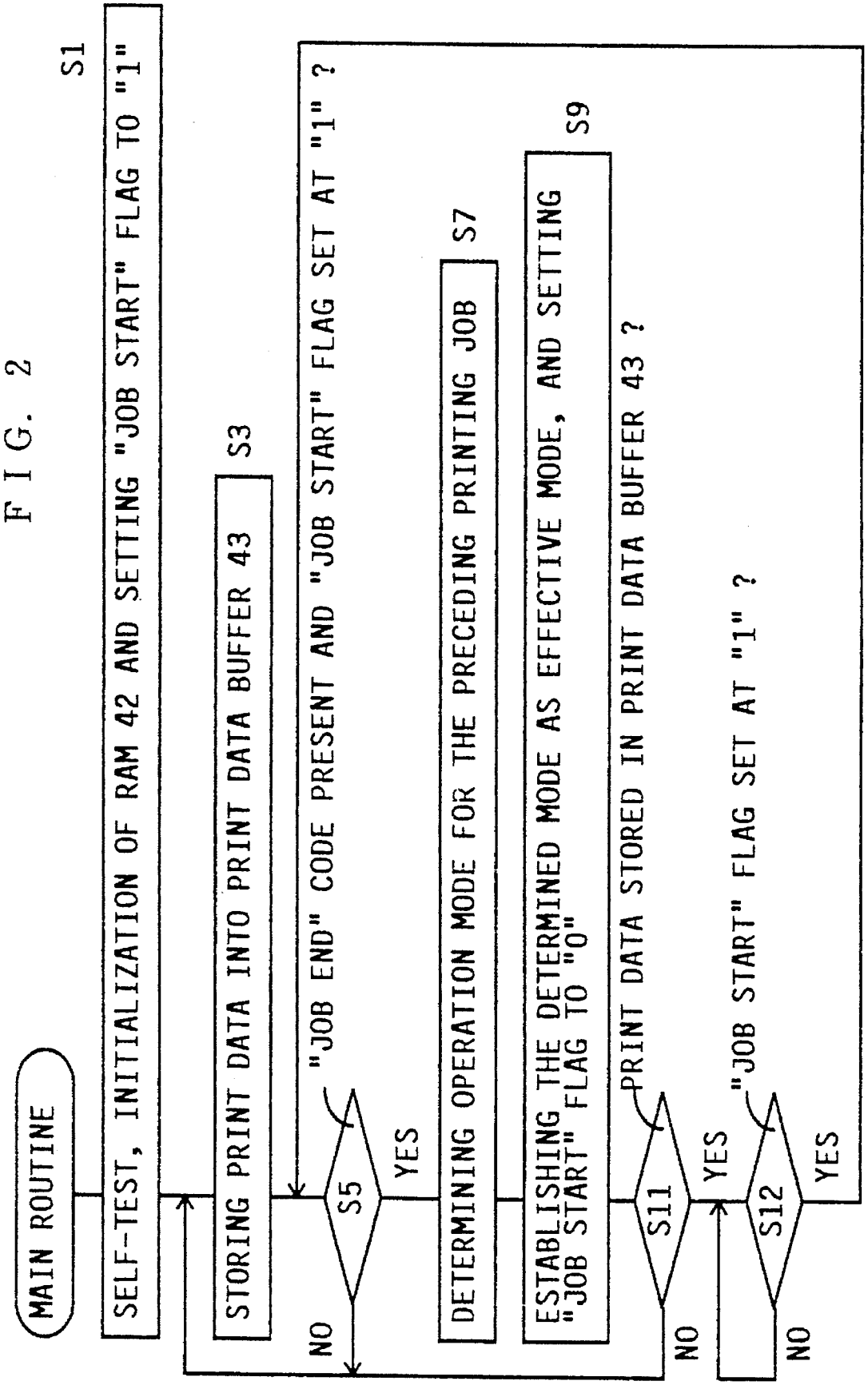
FIG. 2 is a flow chart illustrating a main control routine executed by the control device.
Figure 3:
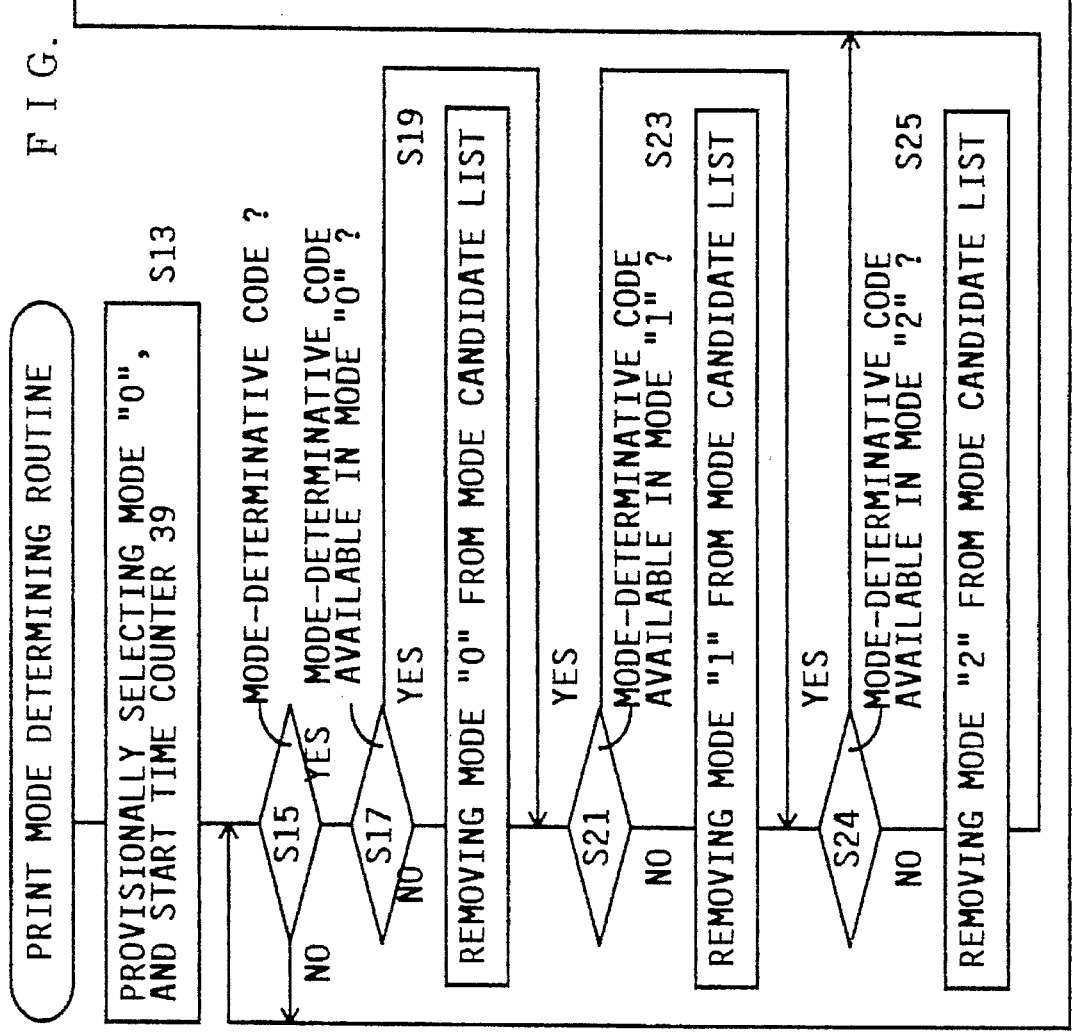
FIG. 3 is a flow chart showing a print mode determining routine performed in the main routine of FIG. 2.
Figure 4:
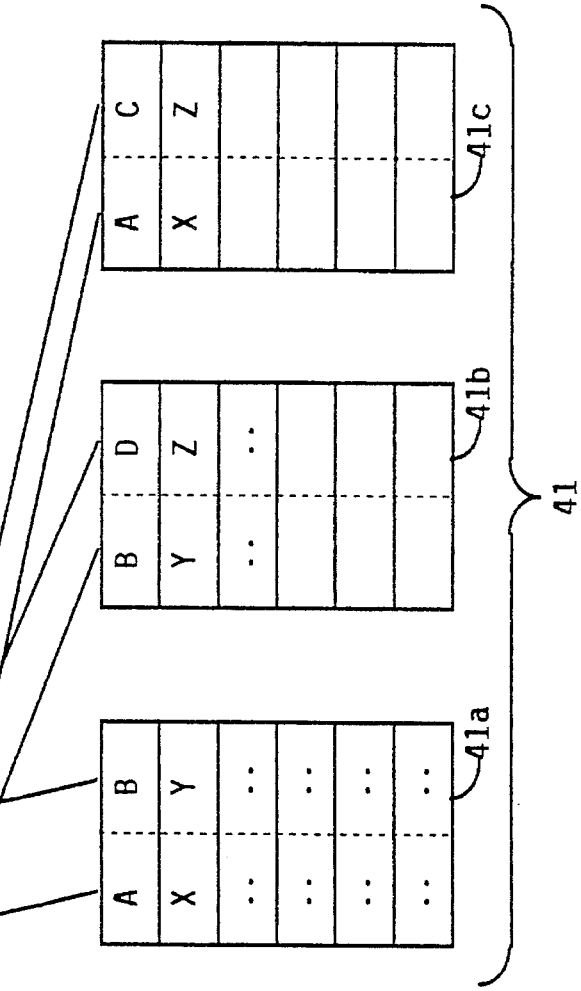
FIG. 4 is an illustration indicating an operation of comparing mode-determinative codes in print data with codes stored in a code table memory of the controller.

The ROM 40 stores various control programs including a main routine illustrated in the flow chart of FIG. 2, a mode determining routine illustrated in the flow chart of FIG. 3, and a 4-secs. interruption routine illustrated in the flow chart of FIG. 5. The ROM 40 includes a code table memory 41 consisting of three code tables 41a, 41b and 41c, as shown in FIG. 4. For example, the first, second and third code tables 41a, 41b, 41c store respective lists of mode-determinative control codes used for respective operation modes "0", "1" and "2" in which respective different types of printers are operated according to respective batches of print data to perform printing jobs. Each mode-determinative control code consists of two character codes, which determine the operation mode in which a printing job represented by each job unit of print data is performed.

The RAM 42 includes a print data buffer 43 for temporarily storing print data (including dot data, and control codes such as the mode-determinative and unit-determinative codes), and a first and a second register 44, 45 which will be described by reference to FIG. 4.

The present printer emulator in the form of the laser printer constructed as described above is capable of emulating a plurality of different types of printers, for performing individual printing jobs represented by respective job units of print data which are received by the host computer 46 from different external computers or terminals. As described below in detail, each job unit of the print data is detected by the control device 32, on the basis of the unit-determinative control codes in the form of JOB END codes which appear at the end of the individual job units of the print data. Further, the effective operation mode in which each printing job is performed is determined by the control device 32, on the basis of the mode-determinative control codes in the print data, by comparing these mode-determinative control codes with the control codes (mode-determinative control codes) stored in the first, second and third code tables 41a, 41b, 41c of the code table memory 41. The laser printing device 8 controls the drivers 24, 26 and 30, so as to perform each printing job in the determined effective operation mode according to the corresponding job unit of print data received.

A main control routine whose program is stored in the ROM 40 of the present laser printer will be described by reference to the flow chart of FIG. 2.

When the present laser printer is turned on with electric power applied thereto, the CPU 38 of the control device 32 first executes step S1 for initialization, that is, for performing a self-diagnostic test, initialization of the RAM 42, setting a JOB START flag to "1", etc. Step S1 is followed by step S3 in which a batch of print data received from the host computer 46 is stored in the print data buffer 43 of the RAM 42.

Then, the control flow goes to step S5 to determine whether the print data stored in the print data buffer 43 includes a unit-determinative code in the form of the JOB END code while at the same time the JOB START flag is set at "1". The JOB END code is indicative of the end of a job unit of the print data which represents a printing job. If the JOB END code is not included in the print data stored in the print data buffer 43 or the JOB START flag is set at "0", a negative decision (NO) is obtained in step S5, and the control flow goes back to step S3 so that a next batch of print data received from the host computer 46 is stored in the print data buffer 43. If the JOB END code is detected in the print data stored in the buffer 43 while the JOB START flag is set at "1", an affirmative decision (YES) is obtained in step S5, and the control flow goes to step S7 to perform a mode determining routine of FIG. 3 for determining the effective operation mode in which the printing job represented by the relevant job unit of print data is performed. The mode determining routine will be described later by reference to FIG. 3.

Step S7 is followed by Step S9 in which the determined operation mode is established as the effective operation mode, and the JOB START flag is reset to "0". Then, the control flow goes to step S11 to determine whether or not any job unit of the print data is left stored (i.e., the next job unit is stored) in the print data buffer 43. If the next job unit is not stored in the buffer 43, the control flow returns to step S3 to receive the next batch of print data from the host computer 46.

If the next job unit of the print data is stored in the buffer 43, step S12 is executed to determine whether the JOB START flag is set at "1" or not. Since the JOB START flag is set to "0" in step S9, a negative decision (NO) is obtained in step S12 until the JOB START flag is set to "1" in the 4-secs. interruption routine of FIG. 5, which will be described. In other words, step S12 is repeatedly executed until the JOB START flag is set to "1". The significance of the JOB START flag will be described later.

If an affirmative decision (YES) is obtained in step S12 with the JOB START flag set at "1" as described below, the control flow returns to step S5 to implement the mode determining routine in step S7 for the next job unit of print data stored in the buffer 43.

The mode determining routine in step S7 of the main routine of FIG. 2 will be described by reference to the flow chart of FIG. 3.

Initially, step S13 is executed to provisionally select the operation mode "0" as the effective operation mode, and start the time counter 39. Step S13 is followed by step S15 to detect the mode-determinative code in the print data stored in the buffer 43. Step S15 is repeated until any mode-determinative code is detected. When any mode-determinative code is detected, an affirmative decision (YES) is obtained in step S15, and step S17 is implemented to determine whether or not the detected mode-determinative code is available in the operation mode "0", that is, whether or not the mode-determinative code is found in the list of mode-determinative codes stored in the first code table 41a.

The operation in step S17 will be described referring to FIG. 4, which shows a portion of the print data in the buffer 43, and portions of the contents of the code tables 41a, 41b, 41c of the code table memory 41 of the ROM 40. In this example, the mode-determinative code following each ESC code consists of two successive character codes. In step S17, these two successive character codes following the ESC code are first transferred to the first register 44 of the RAM 42, and the first pair of two character codes stored in the first code table 41a are transferred to the second register 45 of the RAM 42. Then, the contents of the first and second registers 44, 45 are compared with each other, to determine whether the content of the first register 41a is identical with the content of the second register 41b, namely whether or not the relevant mode-determinative code (two successive character codes) is found in the first code table 41a.

In the example of the mode-determinative code "XY" following the first ESC code in the buffer 43, the relevant two character codes "X" and "Y" in the first register 44 are first compared with the first pair of character codes "A" and "B" transferred to the second register 45. Since the contents of the two registers 44, 45 are not identical with each other, the second pair of character codes "X" and "Y" are then transferred to the second register 45, and the content "XY" of the first register 44 is compared with the thus updated content "XY" of the second register 45. At this time, the first mode-determinative code "XY" is identical with the mode-determinative code "XY" stored in the first table memory 41a. This means that the code "XY" is available in the operation mode "0", and an affirmative decision (YES) is obtained in step S17.

In the example of the mode-determinative code "AB" following the second ESC code, too, the affirmative decision (YES) is obtained in step S17 since the mode-determinative code "AB" is stored in the first code table 41a.

While three or more character codes are used as control codes following each ESC code, only the first two successive character codes are used as the mode-determinative code by which it is possible to determine the effective operation mode in which a printing job is performed according to the portion of the print data which includes the mode-determinative code in question. Accordingly, the determination in step S17 can be effected with high efficiency, and the required capacity of the code table 41a can be made relatively small.

If a negative decision (NO) is obtained in step S17, namely, if the two character codes in the print data stored in the buffer 43 are not detected in the first code table 41a for the operation mode "0", step S19 is implemented to remove the mode "0" from a list of candidate modes which initially consists of the three operation modes "0", "1" and "2". Step S19 is followed by step S21 to determine whether or not the mode-determinative code in question is found in the second code table 41b for the operation mode "1", namely, whether or not the mode-determinative code is available in the operation mode "1". This determination is identical with that in step S17, except for the use of the second code table 41b in place of the first code table 41a.

If the affirmative decision (YES) is obtained in step S17, step S19 is skipped and step S17 is followed by step S21. If a negative decision (NO) is obtained in step S21, step S23 is implemented to remove the operation mode "1" from the list of candidate modes, before step S24 is implemented. If an affirmative decision (YES) is obtained in step S21, step S23 is skipped, and step S21 is followed by step S24. This step S24 is identical with step S17 or S21, except for the use of the third code table 41c. If a negative decision (NO) is obtained in step S24, step S25 is implemented to remove the operation mode "2" from the list of candidate modes, before step S27 is implemented. If an affirmative decision (YES) is obtained in step S24, step S25 is skipped, and step S24 is followed by step S27.

With steps S17, S19, S21, S23, S24 and S25 implemented as described above, the candidate modes except one candidate mode are usually removed from the list of candidate modes. In the example of the mode-determinative code "XY" following the first ESC code shown in FIG. 4, the operation mode "0" is left in the candidate list. Step S27 is provided to determine whether only one candidate mode remains or not. If an affirmative decision (YES) is obtained in step S27, step S33 is executed to determine the remaining candidate mode as the effective operation mode, and the present mode determining routine of FIG. 3 is terminated and the control flow goes to step S9 of the main routine of FIG. 2. The thus determined mode is substituted for the mode "0" provisionally selected in step S13.

If two or more candidate modes remain, namely, if a negative decision (NO) is obtained in step S27, step S29 is implemented to determine whether or not all of the three operation modes "0", "1" and "2" have been removed from the candidate list, with steps S19, S23 and S25 executed. If an affirmative decision (YES) is obtained in step S29, an operation mode error is constituted in step S31, informing the operator that the relevant job unit of the print data stored in the print data buffer 43 is not acceptable on the present printer emulator. In this case, the mode determining routine of FIG. 3 is terminated, and the main routine of FIG. 2 is terminated. If a negative decision (NO) is obtained in step S31, this means that the two or three operation modes are still left in the candidate list, and the control flow returns to step S15 to further proceed with the determination of the effective operation mode, on the basis of the next mode-determinative control code in the relevant portion of the print data stored in the buffer 43.

In the example of FIG. 4 wherein the mode-determinative code "XY" following the first ESC code is found in the first code table 41a, but not found in the second and third code tables 41b, 41c, only the operation mode "0" is left in the list of candidate modes, whereby an affirmative decision (YES) is obtained in step S27. Consequently, the operation mode "0" is determined as the effective operation mode in step S33, and the control flow goes to step S9 in which the operation mode "0" is established and the JOB START flag is set to "0".

As previously indicated, step S11 is then implemented to determine whether or not the next job unit of the print data is stored in the print data buffer 43. If an affirmative decision (YES) is obtained in step S11, step S12 is repeatedly implemented until the JOB START flag is set to "1". If a negative decision (NO) is obtained in step S11, steps S3 and S5 are repeatedly executed until the JOB START flag is set to "1", even if the JOB END code is present.

When the time counter 39 which was started in step S13 of the mode determining routine of FIG. 3 has detected a lapse of four seconds from the commencement of the mode determining routine (step S7 of the main routine of FIG. 2), the 4-secs. interruption routine of FIG. 5 is executed, starting with step S37 to determine whether or not the effective operation mode has been determined in step S33 (whether or not the effective operation mode determined in step S33 has been established in step S7). If an affirmative decision (YES) is obtained in step S37, step S39 is implemented to command the optical printing device 8 to perform a printing job in the established effective operation mode, according to the relevant job unit of the print data stored in the print data buffer 43, more precisely, according to the dot data prepared by the video controller 36 by conversion from the print data stored in the buffer 43.

If a negative decision (NO) is obtained in step S37, namely, if the two or three modes are still left in the list of candidate modes (with steps S15–S29 having been repeatedly executed by the time the 4-secs. interruption routine was commenced), step S41 is implemented to select one of the remaining candidate modes as the effective operation mode according to a predetermined rule, and command the printing device 8 to perform the printing job in the selected operation mode, according to the relevant job unit of the print data. The rule for this compulsory selection of the effective operation mode in step S41 may be a rule in which one of the remaining candidate modes is selected as the effective operation mode according to a predetermined priority order of selection. For example, the first priority is given to the mode "0", and the second and third priorities are given to the modes "2" and "1", respectively. If the mode "0" has been removed in step S19 and the modes "2" and "1" remain in the candidate list, for example, the mode "2" having the second priority rather than the mode "1" having the third priority is selected as the effective operation mode in step S41.

Step S39 and S40 are followed by step S42 in which the JOB START flag is set to "1". Thus, the JOB START flag is set to "1" after a printing job is performed according to the appropriate job unit of the print data. In other words, the affirmative decision (YES) is not obtained in step S12 until the interruption routine of FIG. 5 is executed to perform a printing job according to a job unit of the print data, so that the determination of the effective operation mode for the next job unit of the print data is not started until the printing job according to the preceding job unit is terminated. It will therefore be understood that once step S7 is executed to determine the effective operation mode for one printing job, this step S7 cannot be executed again during the 4-secs. period, and can be executed again only after the printing job whose mode has been determined is completed by execution of the 4-secs. interruption routine. However, the present emulator may be modified such that the determination of the effective operation mode for the next job unit is effected while the printing job according to the present job unit is being performed.

As described above, the 4-secs. interruption routine of FIG. 5 is started to perform a printing job four seconds after the commencement of the mode determining routine in step S7 of the main routine of FIG. 2. In this respect, it is noted that the determination of the effective operation mode for a job unit of the print data can be usually completed within the 4-secs. period, and that the failure to obtain the single candidate operation mode as the effective operation mode within the 4-secs. period means that it is impossible to determine the effective operation mode even if a further time is allowed for the determination. For instance, where a printing job may be performed in either the mode "1" or the mode "2", these two modes remain in the candidate list even after the period of four seconds has elapsed. In this case, it is not necessary to determine the effective operation mode, and therefore the interruption routine is started without a further time spent in determining the effective operation mode, so that the printing job in question is performed in the mode determined in step S41 according to the predetermined rule as described above.

In the present printer emulator in the form of a laser printer constructed and operated as described above, the determination of the effective operation mode is effected for each of the job units of the print data representative of respective printing jobs, when each unit-determinative code in the form of the JOB END code appears in the print data received from the host computer. Namely, the end of each job unit of the print data is determined by detecting the JOB END code in the illustrated embodiment. However, the JOB END code may be a paper eject command for ejecting a paper sheet (e.g., form sheet), or a printer reset command for resetting the control device 32. Further, the unit-determinative code may be any other code such as: a job start code representative of the beginning of each job unit of the print data; a combination of a plurality of control codes the number of which is larger than a predetermined value; and a combination of a plurality of control codes which appear in the print data in a predetermined order.

In the case where the job end code is used as the unit-determinative code, the last job unit of the print data stored in the buffer 43 cannot be detected. To perform the printing job according to this last job unit, the main routine of FIG. 3 should be modified so as to start the time counter 39 just before the execution of step S5, so that the interruption routine of FIG. 5 is commenced a suitable time after the execution of step S5, for implementing step S41 for a printing operation according to the last job unit in the suitably selected mode.

As described above, the present printer emulator is capable of emulating two or more different types of printers which operate in respective different operation modes, that is, capable of performing individual printing jobs in respective modes suitable for the jobs, even if the printer emulator is used in a network which includes a plurality of computers or terminals and is adapted to receive batches of print data which are written in different formats. Therefore, the individual printing jobs commanded by the different computers can be performed in the suitable operation modes. The present printer emulator is free from the conventionally experienced problem that the printing job is effected in a mode other than the mode desired by the operator of an external computer or terminal.

What is claimed is:

1. A printer emulator having a function of emulating a plurality of types of printers which operate in respective operation modes, said printer emulator being operable according to print data in a selected one of said operation modes of said plurality of printers, said printer emulator comprising:

print data memory means for storing said print data consisting of a plurality of job units each of which represents a printing job, said print data comprising control codes which include at least one mode-determinative code which determines an effective operation mode in which each of said plurality of job units of said print data is executed;

said control codes of said print data further including a plurality of unit-determinative codes which determine said each job unit of said print data, said plurality of unit-determinative codes comprising at least one of a combination of a plurality of said control codes, the number of which is larger than a predetermined value; and a combination of a plurality of said control codes which appear in said print data in a predetermined order;

unit detecting means for detecting each of said plurality of job units of said print data on the basis of said plurality of unit-determinative codes;

mode determining means, operable on the basis of said at least one mode-determinative code after each of said plurality of job units of said print data has been detected by said unit detecting means, for determining said effective operation mode for each of said plurality of job units of said print data; and printing means, responsive to said mode determining means, for performing said printing job according to each of said plurality of job units of said print data in said effective operation mode determined by said mode determining means.

2. A printer emulator having a function of emulating a plurality of types of printers which operate in respective operation modes, said printer emulator being operable according to print data in a selected one of said operation modes of said plurality of printers, said printer emulator comprising:

print data memory means for storing said print data consisting of a plurality of job units each of which represents a printing job, said print data comprising control codes which includes at least one mode-determinative code which determines an effective operation mode in which each of said plurality of job units of said print data is executed, said control codes of said print data further including a plurality of unit-determinative codes which determine said each job unit of said print data, said plurality of unit-determinative codes comprising at least one of a combination of a plurality of said control codes, the number of which is larger than a predetermined value, and a combination of a plurality of said control codes which appear in said print data in a predetermined order;

unit detecting means for detecting each of said plurality of job units of said print data on the basis of said plurality of unit-determinative codes;

mode determining means, operable on the basis of said at least one mode-determinative code after each of said plurality of job units of said print data has been detected by said unit detecting means, for determining said effective operation mode for each of said plurality of job units of said print data, wherein said mode determining means determines said effective operation mode if said at least one mode-determinative code is sufficient for said mode determining means to be able to determine, as said effective operation mode, one of a plurality of candidate modes of said operation modes of said plurality of printers; and compulsory mode selection means for selecting, as said effective operation mode, one of said candidate modes according to a predetermined rule, if said at least one mode-determinative code is sufficient for said mode determining means to be able to limit said effective operation mode to a plurality of said candidate modes but insufficient to limit said effective operation mode to one of said candidate modes;

time measuring means for measuring an operation time of said mode determining means, and commanding said compulsory mode selection means to operate when said operation time measured by said time measuring means exceeds a predetermined limit; and printing means, responsive to said mode determining means, for performing said printing job according to each of said plurality of job units of said print data in said effective operation mode determined by said mode determining means.

3. A printer emulator having a function of emulating a plurality of types of printers which operate in respective operation modes, said printer emulator being operable according to print data in a selected one of said operation modes of said plurality of printers, said printer emulator comprising:

print data memory means for storing said print data consisting of a plurality of job units each of which represents a printing job, said print data comprising control codes which influence said printing job to be performed according to said job unit of said print data;

said control codes of said print data including a plurality of mode-determinative codes which determine an effective operation mode in which each of said plurality of job units of said print data is executed, said plurality of mode-determinative codes comprising at least one of a combination of a plurality of said control codes the number of which is larger than a first predetermined value, and a combination of a plurality of said control codes which appear in said print data in a first predetermined order;

said control codes of said print data further including a plurality of unit-determinative codes which determine said each job unit of said print data, said plurality of unit-determinative codes comprising at least one of a combination of a plurality of said control codes the number of which is larger than a second predetermined value, and a combination of a plurality of said control codes which appear in said print data in a second predetermined order;

unit detecting means for detecting each of said plurality of job units of said print data on the basis of said plurality of unit-determinative codes;

mode determining means, operable on the basis of said plurality mode-determinative codes after each of said plurality of job units of said print data has been detected by said unit detecting means, for determining said effective operation mode for each of said plurality of job units of said print data; and printing means, responsive to said mode determining means, for performing said printing job according to each of said plurality of job units of said print data in said effective operation mode determined by said mode determining means.

4. A printer emulator having a function of emulating a plurality of types of printers which operate in respective operation modes, said printer emulator being operable according to print data in a selected one of said operation modes of said plurality of printers, said printer emulator comprising:

print data memory means for storing said print data consisting of a plurality of job units each of which represents a printing job, said print data comprising control codes which influence said printing job to be performed according to each said job unit of said print data;

said control codes of said print data including a plurality of mode-determinative codes which determine an effective operation mode in which each of said plurality of job units of said print data is executed, said plurality of mode-determinative codes comprising at least one of a combination of a plurality of said control codes the number of which is larger than a first predetermined value, and a combination of a plurality of said control codes which appear in said print data in a first predetermined order;

said control codes of said print data further including a plurality of unit-determinative codes which determine said each job unit of said print data, said plurality of unit-determinative codes comprising at least one of a combination of a plurality of said control codes the number of which is larger than a second predetermined value, and a combination of a plurality of said control codes which appear in said print data in a second predetermined order;

unit detecting means for detecting each of said plurality of job units of said print data on the basis of said plurality of unit-determinative codes;

mode determining means, operable on the basis of said plurality mode-determinative codes after each of said plurality of job units of said print data has been detected by said unit detecting means, for determining said effective operation mode for each of said plurality of job units of said print data, wherein said mode determining means determines said effective operation mode if said plurality of mode-determinative codes are sufficient for said mode determining means to be able to determine, as said effective operation mode, one of a plurality of candidate modes of said operation modes of said plurality of printers;

compulsory mode selection means for selecting, as said effective operation mode, one of said candidate modes according to a predetermined rule, if said plurality of mode-determinative codes are sufficient for said mode determining means to be able to limit said effective operation mode to a plurality of said candidate modes but insufficient to limit said effective operation mode to one of said candidate modes;

time measuring means for measuring an operation time of said mode determining means, and commanding said compulsory mode selection means to operate when said operation time measured by said time measuring means exceeds a predetermined limit; and printing means, responsive to said mode determining means, for performing said printing job according to each of said plurality of job units of said print data in said effective operation mode determined by said mode determining means.

5. A printer emulator according to claim 1, wherein each of said control codes consists of a plurality of successive character codes, and said at least one mode-determinative code consists of a part of said plurality of successive character codes, said mode determining means determining said effective operation mode on the basis of said part of said plurality of successive character codes.

6. A printer emulator according to claim 1, wherein each of said control codes consists of a plurality of groups of character codes, and said at least one mode-determinative code consists of parts of said character codes which are selected from said plurality of groups, respectively, said mode determining means determining said effective operation mode on the basis of said combination.

7. A printer emulator according to claim 1, wherein said mode determining means comprises:

code detecting means for detecting said at least one mode-determinative code and determines said effective operation mode on the basis of said at least one mode-determinative code detected by said code detecting means;

control code memory means for storing control codes used in said respective operation modes of said plurality of printers; and code comparing means for comparing each of said at least one mode-determinative code detected by said code detecting means, with said control codes stored in said control code memory means, and thereby determining said effective operation mode for said each job unit of said print data.

8. A printer emulator according to claim 7, further comprising alarm means responsive to said code comparing means for providing an alarm if said code comparing means has found that said at least one mode-determinative code detected by said code detecting means is identical with none of said control codes stored in said control code memory means.

9. A printer emulator according to claim 1, wherein said printing means includes dot-matrix printing means for printing each of characters represented by said print data, in a matrix of dots.

10. A network comprising a printer emulator as defined in claim 1, and a plurality of computers connected to said printer emulator so that said printer emulator receives from said plurality of computers respective batches of print data for printing in said respective operation modes of said plurality of printers.

11. A printer emulator according to claim 1, wherein said print data memory means stores said plurality of job units before said unit detecting means and said mode determining means start to operate.

12. A printer emulator according to claim 1, wherein said print data memory means receives said plurality of job units while said unit detecting means and said mode determining means are operating after the printer emulator is turned on.

* * * * *